UNITED STATES PATENT OFFICE.

SAMUEL C. HENSZEY, JR., OF WEST CHESTER, PENNSYLVANIA.

IMPROVED BRONCHIAL TROCHE.

Specification forming part of Letters Patent No. 55,292, dated June 5, 1866.

*To all whom it may concern:*

Be it known that I, SAMUEL C. HENSZEY, Jr., of West Chester, in the county of Chester and State of Pennsylvania, have invented a new and useful article of medicine, denominated "Ammoniated Bronchial Troches," for the alleviation of bronchitis, diphtheria, colds, &c.; and I do hereby declare the following to be a full, clear, and exact description of the making, compounding, and using of the same.

The nature of my invention consists in the use of muriate of ammonia in combination with certain other ingredients or parts, or compounded therewith,(which ingredients or parts will be hereinafter mentioned,) whereby from the said mixture or compound a troche or lozenge of a suitable size is made, denominated "ammoniated bronchial troches," which troches or lozenges have been found to alleviate bronchitis, diphtheria, asthma, hoarseness, sore throat, and all diseases arising from the breath and lungs.

To enable any one skilled in the art to make and use my invention as compounded, embodying the muriate of ammonia as the principal feature of the same, I will proceed to describe the component parts of the compound, giving the name and proportionate quantity of each part, as follows, viz: muriate of ammonia, two ounces; chlorate of potash, one ounce; cubebs, pulverized, two ounces; extract of liquorice, sixteen ounces; gum-arabic, eight ounces.

The different parts here given are united into a mass or compound with the sirup of tolu, and flavored with a sufficient quantity of winter-green; after which the mass is rolled out to the proper thickness to make a troche or lozenge, and by means of a circular or other formed cutter or knife a troche or lozenge of the usual size is made.

The number of troches proposed to be put in each box is about fifty, (50,) the same being of a suitable size to contain them, and with sliding drawers, as to be convenient for use.

Having thus fully described my invention, what I claim as new, and desire to secure by Letters Patent, is—

The use of muriate of ammonia, as compounded with certain other parts or ingredients, herein named, or the component parts, as combined, compounded, and made into a troche or lozenge, substantially in the manner and for the purpose as herein specified.

SAMUEL CONCH HENSZEY, JR.

Witnesses:
CHAS. H. PENNYPACKER,
U. V. PENNYPACKER.